United States Patent [19]

Zatkos et al.

[11] Patent Number: 4,581,834
[45] Date of Patent: Apr. 15, 1986

[54] ANIMAL TAG WITH LOCKING INSERT

[75] Inventors: Robert J. Zatkos; Joe D. Kellerby; Ronald K. Knapp, all of Cody, Wyo.

[73] Assignee: Y-Tex Corporation, Cody, Wyo.

[21] Appl. No.: 547,749

[22] Filed: Nov. 1, 1983

[51] Int. Cl.[4] .............................................. G09F 3/00
[52] U.S. Cl. ........................................ 40/301; 40/300; 119/156
[58] Field of Search .......................... 40/300, 301, 302; 119/156; 63/12; 24/108

[56] References Cited

U.S. PATENT DOCUMENTS

| 350,112 | 10/1886 | Burrows ................................ 40/301 |
| 2,219,569 | 10/1940 | Vanderhoof ........................ 119/156 |
| 3,731,414 | 5/1973 | Murphy et al. ....................... 40/301 |
| 4,021,952 | 5/1977 | Brierly ................................... 40/301 |
| 4,209,924 | 7/1980 | Fearing ................................. 40/301 |
| 4,265,876 | 5/1981 | Feakins ................................. 40/301 |

FOREIGN PATENT DOCUMENTS

| 56533 | 7/1982 | European Pat. Off. .............. 40/301 |
| 2489445 | 3/1982 | France ................................... 40/301 |
| 2510205 | 1/1983 | France ................................... 40/301 |
| 8102068 | 11/1982 | Netherlands ......................... 40/301 |
| 25481 | 4/1911 | United Kingdom .................. 40/301 |
| 2041833 | 9/1980 | United Kingdom .................. 40/301 |

Primary Examiner—Gene Mancene
Assistant Examiner—Cary E. Stone
Attorney, Agent, or Firm—Willian Brinks Olds Hofer Gilson & Lione

[57] ABSTRACT

A locking insert for a two-component animal ear tag, such as an identification tag or an insecticide tag which uses a flexible, resilient plastic for insecticide or other pest-controlling active ingredient, includes a hollow cylindrical part, a flexible locking ring which is convexly deformed to grasp and resist withdrawal of the male tag component, and an outer flange. The locking insert is positioned in a female tag body component prior to insertion of the male tag component.

11 Claims, 9 Drawing Figures

ANIMAL TAG WITH LOCKING INSERT

BACKGROUND OF THE INVENTION

This invention relates to animal tags used to provide identification and/or insecticide protection to animals, particularly cattle, but also other domestic animals or wild life. In particular, the present invention relates to a two-component animal tag having a locking insert. The invention is particularly useful in connection with an animal tag which contains a pest-controlling active ingredient in order to protect the animal from the attack of insects and other ectoparasites.

Animal tags are commonly used to identify specific animals in a herd or group in order to maintain records for breeding purposes, milk records, feeding plans, wool production and the like. Recently, similar tags which contain an insecticide chemical have been used to protect the animal from pests such as horn flies, face flies, Gulf Coast ticks, spinose ear ticks, stable flies, houseflies, and lice. Such insecticide tags may bear identification information as well, or may be applied solely for pest control.

The ear of the animal has been found to be a particularly satisfactory place to locate an identification or insecticide tag. For identification purposes, this location provides high visibiltiy. For insecticide purposes, since the animal naturally tends to rub its head on its body, this action distributes the insecticide.

It is also desirable that such tags be sufficiently flexible so as not to snag on objects such as brush, fences, trees or the like.

In recent years, two-component animal tags have become popular. Such tags include a male portion which is passed through the ear of the animal and mated with the female portion. In most instances, the tag body component (the information-carrying portion or insecticide-impregnated portion) is associated with the female portion of the tag. Such tags are shown, for example, in U.S. Pat. No. 3,260,007 to Hayes and in commonly assigned copending application Ser. No. 435,704, filed Oct. 21, 1982, the disclosure of which is incorporated herein by reference.

Insecticide ear tags are made of a thermoplastic material such as flexible polyvinyl chloride, which contains a pest-controlling active ingredient. The active ingredient gradually and continually migrates to the surface of the tag body and is rubbed onto the hair of the animal. The active ingredient is one which kills, repels, regulates growth, sterilizes, or by any other way reduces the harmful effects of ectoparasites, including insects, ticks, and other lower forms of life which attack the animal.

A problem that is especially serious with the chemically impregnated plastic ear tags is that the impregnated plastic part tends to be quite soft. Because of this softness, the male portion of the tag can pull out of the female portion after the tag has been installed, so that the tag is lost.

It is, accordingly, a purpose of this invention to provide a locking insert which can be used to resist separation of the male and female components of a two-component animal tag. A further object of the present invention is to provide such an insert which can be easily and inexpensively manufactured, and can be used in conjunction with existing ear tag bodies.

SUMMARY OF THE INVENTION

The present invention provides a female tag component for a two-component animal tag to be attached to an ear or the like of an animal, comprising
(a) a tag body component;
(b) a generally cylindrical boss on said body component defining a well having an inside diameter, the boss and body components constituting a first integral piece of plastic material; and
(c) an aperture in the body component at the base of the well;
(d) a unitary locking insert positioned in the well portion, the locking insert comprising
  (i) a hollow cylindrical portion having an outside diameter substantially equal to the inside diameter of the well, and having a length at least as great as that of the well; and
  (ii) an inwardly projecting flexible locking ring at one end of the cylindrical portion;
  the locking insert being constructed of a material which permits the flexible locking ring to be convexly deformed when a male tag component is passed therethrough, and having a limit of elasticity which permits it to maintain its convexly deformed shape, whereby to resist withdrawal of the male tag component.

DETAILED DESCRIPTION

Figure 1:
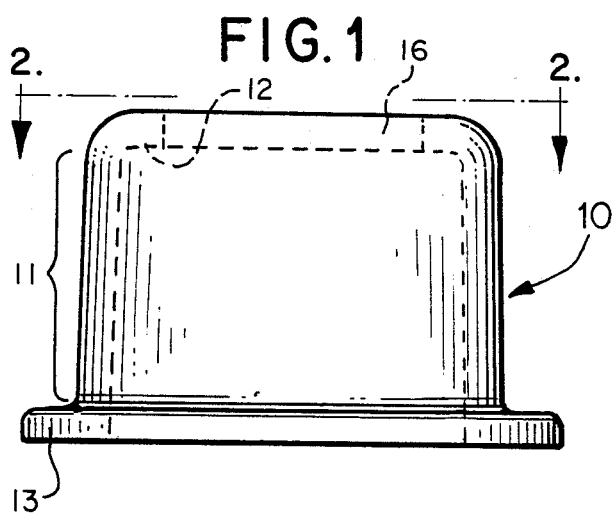
FIG. 1 is a side view of a locking insert according to a preferred embodiment of the present invention.
Figure 3:
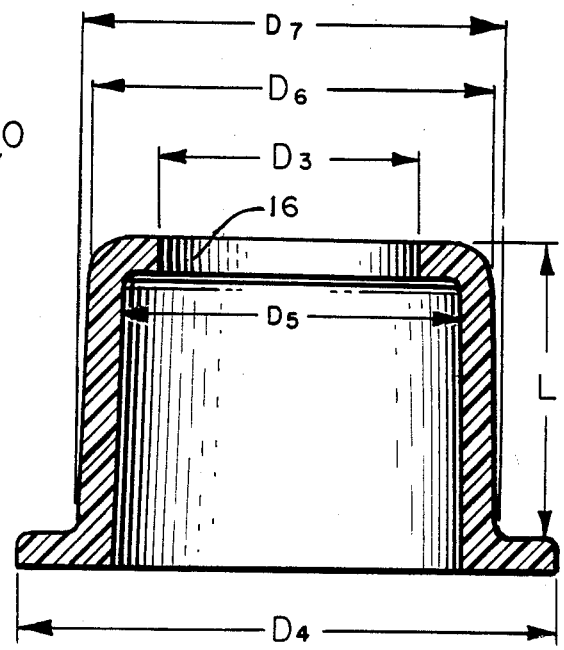
FIG. 3 is a sectional view of the locking insert of the present invention, taken along line 3—3 of FIG. 2.
Figure 2:
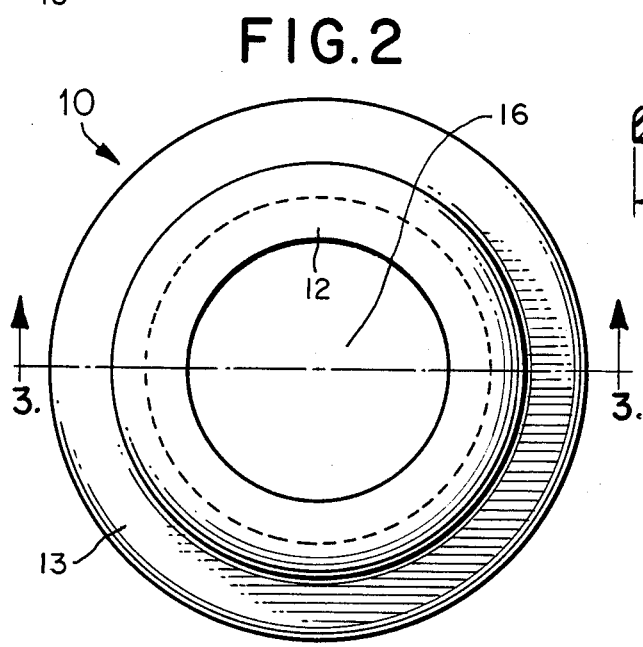
FIG. 2 is a top view of the locking insert of the present invention, taken along line 2—2 of FIG. 1.

Turning now to the preferred embodiment shown in the drawings, FIGS. 1-3 illustrate the locking insert generally 10 of the present invention. The insert 10 comprises a hollow cylindrical portion 11 and a flexible locking ring portion 12. In the most preferred embodiment, the insert 10 also has an outer flange portion 13 at the end opposite the locking ring portion 12. The locking insert 10 is of an integral piece of plastic material, adapted for insertion into the well formed by a boss on the female component of a two-component animal tag, as hereinafter described.

Figure 4:
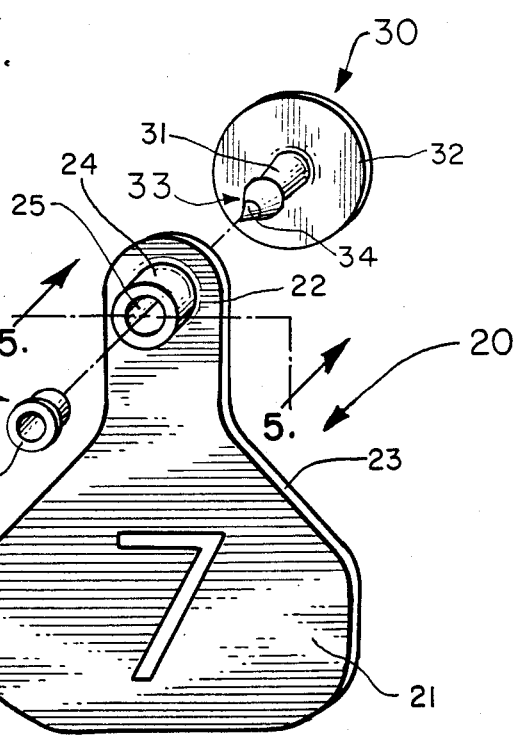
FIG. 4 is an exploded perspective view of a two-component animal tag according to a preferred embodiment of the present invention, illustrating the assembly of the locking insert and male component into the tag body of a two-component animal tag.
Figure 5:
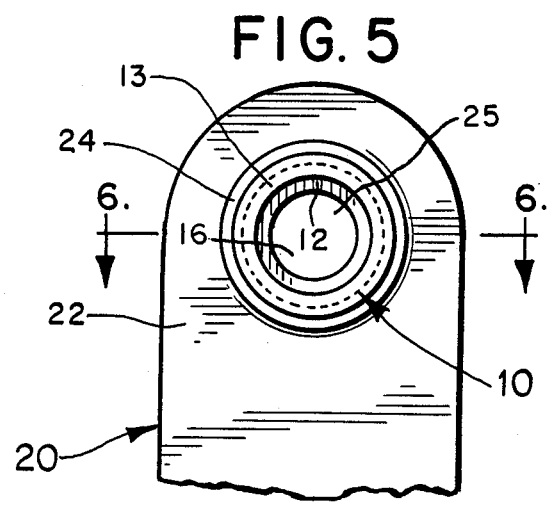
FIG. 5 is a fragmentary plan view of the tag body component of the animal tag illustrated in FIG. 4, taken along line 5—5 of FIG. 4.

FIG. 4 illustrates a conventional female tag body component of an animal tag in conjunction with a locking insert 10, in accordance with the present invention. Portions of the tag body component are shown in greater detail in FIGS. 5, 6 and 8.

The female, tag body component generally 20 comprises a base portion 21, and, in the embodiment shown, a neck portion 22. It will be understood that the shape of the tag body component 20 is not critical, and that it need not have a separate neck portion 22. Here, the neck portion 22 is separated from the base portion 21 by a shoulder portion 23.

At the upper end of the neck portion 22, the tag body component 20 is provided with boss 24 defining a well 25 which has an inside diameter $D_1$.

At the base of the well 25, the body component 20 is provided with an aperture 27, defining a second inside diameter $D_2$, which is smaller than the inside diameter $D_1$ of the well 25.

The base portion 21, the neck portion 22, and the boss 24 all constitute a first integral piece of plastic material. For conventional animal identification tags, polyurethane is a widely used plastic. As noted above, in the case of insecticide tags, flexible polyvinyl chloride is often used, although other suitable materials may be used as well. For example, the tag body 20 may be made of laminated polymer materials, such as a softer piece of flexible polyvinyl chloride containing insecticide bonded to a second piece of tougher polyurethane. Laminated tags may contain layers of different colors so that identification numbers may be branded into the tag by melting parts of one or both outer layers. The tag body 20 may also be made of co-molded materials, i.e. by injecting two kinds of plastic into a mold at the same time, from different sites. The body component 20 may contain a pest-controlling active ingredient; may be provided with identification indicia; or both. The identification indicia may be added by stamping, printing, or other form of marking.

The locking insert 10 constitutes a second integral piece of plastic material adapted for insertion into the well 25 of the body component 20. The hollow cylindrical portion 11 of the locking insert 10 has an outside diameter at its narrower end $D_6$ (see FIG. 3) which is substantially equal to the inside diameter $D_1$ (see FIG. 6) of the well 25, which is preferably not tapered, prior to insertion of insert 10. The outside of hollow cylindrical portion 11 is preferably tapered slightly (about 1° or 2°), having an outside diameter $D_7$ adjacent the outer flange portion 13 which is slightly larger than $D_6$, to facilitate mold removal, insertion of the insert 10 into the boss 24, and to provide a slight interference fit within the outer end of boss 24, to facilitate retention of the insert within the boss 24. The hollow cylindrical portion 11 of the locking insert likewise has a length L, measured to include the flexible locking ring 12, which is at least as great as, and preferably substantially equal to, the length of the well 25. As a result, during installation, the force of inserting the male component is borne by the insert 10, and not by the boss 24. In addition, when the insert 10 is provided with an outer flange portion 13, the flange portion 13 abuts against the outer end 29 of boss 24. This design helps the insert 10 to resist being pulled through the aperture 27 after the male and female portions have been mated by distributing the load over a larger portion of the tag body component 20.

The locking ring portion 12 of the locking insert 10 is flexible so as to permit the insertion of a pin through the locking ring portion 12. The flexible locking ring 12, adjacent one end of the hollow cylindrical portion 11 of the locking insert 10, projects inwardly to provide an aperture 16 having an inside diameter $D_3$ which is as small as workable without breaking when used. For example, regard should be had for the size of the tip of the pin which is to be inserted through the insert. The diameter $D_2$ of the aperture 27 at the base of the well 25 of the tag body component 20 is preferably no larger than the inside diameter $D_3$ of aperture 16. In the most preferred embodiment, the inside diameter $D_3$ of aperture 16 is greater than the inside diameter $D_2$ of aperture 27.

The optional but highly preferred outer flange portion 13 of the locking insert 10 is adjacent the end of the hollow cylindrical portion 11 opposite the locking ring 12, and projects outward and has an outside diameter $D_4$ which is greater than the inside diameter $D_1$ of the well 25, and preferably equal to the outside diameter of the outer end 29 of the boss 24.

Figure 6:
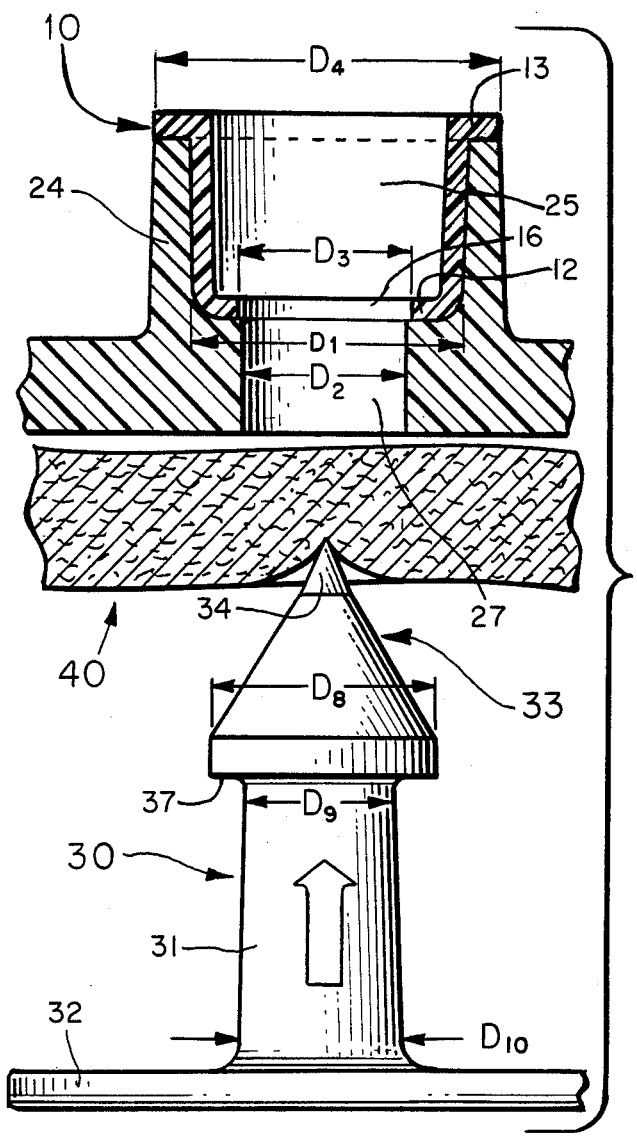
FIG. 6 is a fragmentary sectional view of the portion of the animal tag component illustrated in FIG. 5, taken along line 6—6 of FIG. 5, illustrating also the alignment of the locking insert, the female component of the animal tag, the portion of the ear in which the tag is to be installed, and the male component of the ear tag, prior to insertion into the animal's ear.
Figure 7:
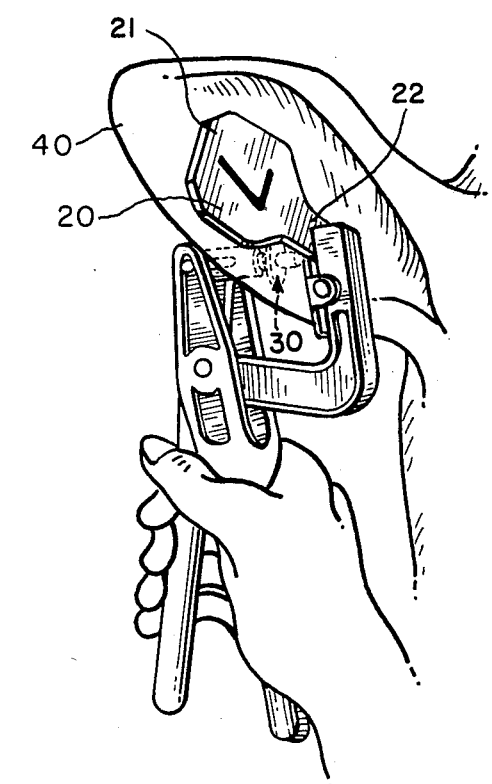
FIG. 7 is a view illustrating the preferred method of application of the tag into an animal's ear.
Figure 8:
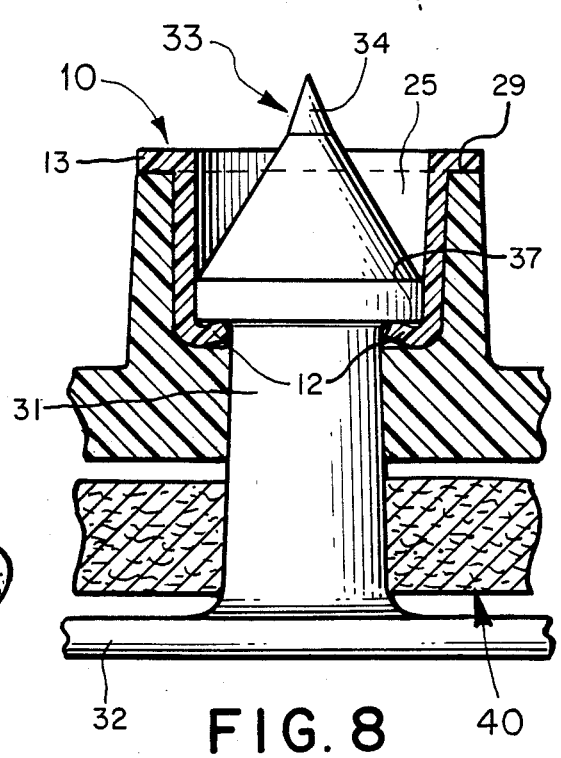
FIG. 8 is a view similar to FIG. 6, but showing the components after insertion through the animal's ear.

The use of the insert is illustrated in FIGS. 6, 7 and 8. As shown in FIG. 6, the locking insert 10 is positioned in the well 25 of the tag body component 20.

The tag body component 20 is intended for use with a pin 30 which comprises a tapered, generally cylindrical stem 31, a flange 32 at one end of the stem, and a pointed end portion 33 at the other end of the tapered cylindrical stem 31. Typically the stem will be slightly tapered, having a narrowest diameter $D_9$ adjacent end portion 33, and a slightly larger diameter $D_{10}$ adjacent flange 32. The end portion 33 is preferably formed of a hard material, and has a sharp point 34 and a shoulder 37. The inside diameter $D_3$ of aperture 16 should be substantially smaller than the maximum diameter $D_8$ of the pointed end portion 33 so that the locking ring 12 will be distorted beyond its elastic limit when the male portion, i.e. pin 30, is mated with the female tag body component 20. The maximum diameter $D_8$ of the pointed end portion 33 of pin 30 is preferably substantially equal to the inside diameter $D_5$ at the base of the hollow cylindrical portion 11 of the insert. The inside diameter $D_3$ of aperture 16 should also be at least as large as the smallest diameter $D_9$ of the stem 31 of pin 30.

Figure 9:
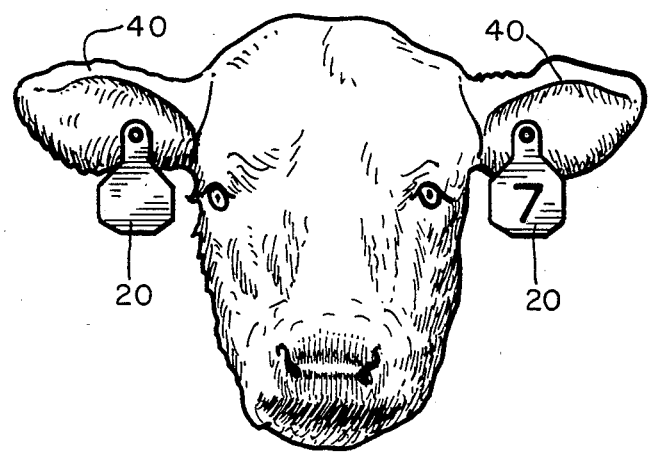
FIG. 9 is an illustration of an animal's head with a tag installed in each ear.

In use, the tag body component 20 containing the locking insert 10 and the pin 30 are aligned on opposite sides of an animal's ear 40 as illustrated in FIG. 6 (see also FIG. 7). The preferred position for the pin to pierce the ear of a cow or steer is between the second and third radial cartilages of the ear. Preferably, the tag body should appear at the front of the ear, as illustrated in FIGS. 7 and 9, but the animal tag may be installed with the body portion at the back of the ear instead, if preferred by the user.

The ear tag assembly as installed in the ear of an animal is illustrated in FIG. 8. The pointed end portion 33 has been inserted through the aperture 27 at the base of the well 25 and through the aperture 16 in the flexible locking ring portion 12 of the locking insert 10; and the flexible locking ring portion 12, is convexly deformed when the pointed end portion 33 of the pin is forced through it, so as to resist disengagement of the pin 30 from the tag body component 20.

Since the locking insert 10 is intended to strengthen the engagement between the male and female components 30 and 20, respectively, it should be made of a strong material. However, the most important characteristic of the material for the locking insert 10 is that it have an elastic limit that causes the locking ring portion 12 to retain a convexly distorted shape, as previously described, and as illustrated in FIG. 8. It is preferred that the narrowest diameter of the tapered stem be no larger than the inside diameter of the locking ring after the ring is convexly deformed.

Specific physical properties of the plastic used for the locking insert which are preferred are as follows: tensile strength at yield should be above 7000 lbs/in$^2$ (psi); flexural modulus should be between $2.25 \times 10^5$ and $4 \times 10^5$ psi; elongation at yield should be between 5 and 12%. These are preferred properties only, and it is to be understood that depending on dimensions of the insert, articles having properties outside these ranges can be used in the present invention.

Specific materials which are preferred for use in the present invention include polyurethanes, nylon-6 and acetals. Other thermoplastic materials can also be used. If desired, the locking insert 10 can be reinforced with conventional strengthening materials such as glass fiber.

A particularly preferred grade of polyurethane is sold under the trade name Isoplast 101 by the Upjohn Company of North Haven, Conn. A suitable nylon-6 is sold under the trade name Capron 8202 by Allied Corporation, Allied Fibers and Plastics Division, Morristown, N.J. Although less preferred than the foregoing, a third material which can be used to form the locking insert 10 is an acetal resin sold under the trade name Delrin 500 by E. I. DuPont de Nemours and Company.

It is to be understood that the materials recited are only those presently contemplated as being preferred, and other equivalent materials can be used, as well. The identity of the pest-controlling active ingredient forms no part of the present invention, but the insecticide chemical permethrin has been found useful. Other pest-controlling active ingredients may be used as well. The active ingredient can be added by any convenient means, such as impregnation or coating plastic particles which are then molded into the tag body component.

Depending on the dosage and type of pest to be controlled, it may be desirable to insert an insecticide tag into each ear of the animal, or one tag may suffice. It is important to treat the entire herd, as ear tags work together to kill pests over the area. The presence of untreated animals in the same field may reduce the overall effectiveness.

Of course, it should be understood that various changes and modifications to the preferred embodiment described above will be apparent to those skilled in the art. Such changes and modifications can be made without departing from the spirit and scope of the present invention, and it is therefore intended that such changes and modifications be covered by the following claims.

We claim:

1. A female tag component for a two-component animal tag to be attached to an ear or the like of an animal, comprising
   (a) a tag body component;
   (b) a generally cylindrical boss on said body component defining a well having an inside diameter, the boss and body component constituting a first integral piece of plastic material; and
   (c) an aperture in the body component at the base of the well; and said tag component further comprising
   (d) a unitary locking insert positioned in the well portion, the locking insert comprising
      (i) a hollow cylindrical portion having an outside diameter substantially equal to the inside diameter of the well, the length of the hollow cylindrical portion of the locking insert being substantially equal to the length of the well in the cylindrical boss on the tag body component;
      (ii) an inwardly projecting flexible locking ring at one end of the cylindrical portion; and
      (iii) an outer flange portion adjacent the end of the hollow cylindrical portion projecting outward and having an outside diameter greater than the inside diameter of the well;
   the locking insert being constructed of a material which permits the flexible locking ring to be convexly deformed when a male tag component is passed therethrough, and having a limit of elasticity which permits it to maintain its convexly deformed shape, whereby to resist withdrawal of the male tag component.

2. A component according to claim 1, wherein the outside diameter of the hollow cylindrical portion of the locking insert is tapered between 1° and 2°, having a larger diameter adjacent the outer flange.

3. A component according to claim 1, wherein the outside diameter of the outer flange portion of the locking insert is substantially equal to the outside diameter of the outer end of the boss.

4. A component according to one of claims 1-3, wherein the first integral piece of plastic material contains a pest-controlling active ingredient.

5. A component according to one of claims 1-3, wherein the first integral piece of plastic material is laminated from a softer piece containing insecticide bonded to a second piece of tougher material.

6. A component according to one of claims 1-3, wherein the insert is a plastic material having a tensile strength above 7,000 psi, a flexural modulus between $2.25 \times 10^5$ and $4 \times 10^5$ psi and an elongation at yield between 5% and 12%.

7. A component according to claim 6, wherein the insert is made from a material selected from the group consisting of polyurethane, nylon-6 and acetal.

8. A two-compartment ear tag assembly comprising
   (1) a female tag component according to one of claims 1-3, the tag body component constituting the first integral piece of plastic material being manufactured of soft, resilient plastic material; and
   (2) a male tag component, adapted for insertion through the aperture at the base of the well and into the well, the male tag component comprising
      (a) a tapered cylindrical stem;
      (b) a flange at one end of the tapered cylindrical stem; and
      (c) a pointed end portion having a maximum diameter greater than the diameter of the stem.

9. A two-component ear tag assembly according to claim 8, wherein the maximum diameter of the pointed end portion is substantially equal to the inside diameter of the hollow cylindrical portion of the insert and larger than the inside diameter of the aperture in the flexible inner flange portion of the insert.

10. A two-component ear tag assembly according to claim 8 wherein the narrowest diameter of the tapered stem is no larger than the inside diameter of the convexly deformed locking ring.

11. A two-component ear tag assembly according to claim 8, wherein the pointed end portion comprises a tip of material selected from the group consisting of metal and hard plastic.

* * * * *

UNITED STATES PATENT AND TRADEMARK OFFICE
CERTIFICATE OF CORRECTION

PATENT NO. : 4,581,834

DATED : April 15, 1986

INVENTOR(S) : Robert J. Zatkos et al.

It is certified that error appears in the above-identified patent and that said Letters Patent is hereby corrected as shown below:

IN THE SUMMARY OF THE INVENTION

In column 2, line 4, please delete "attachedto" and substitute therefor --attached to--.

IN THE CLAIMS

In Claim 8 (column 6, line 43), please delete "compartment" and substitute therefor --component--.

Signed and Sealed this

Seventeenth Day of January, 1989

Attest:

DONALD J. QUIGG

*Attesting Officer*   *Commissioner of Patents and Trademarks*